United States Patent
Evans et al.

(10) Patent No.: US 10,447,720 B1
(45) Date of Patent: Oct. 15, 2019

(54) SYSTEMS AND METHODS FOR PERFORMING APPLICATION CONTAINER INTROSPECTION

(71) Applicant: Symantec Corporation, Mountain View, CA (US)

(72) Inventors: Nathan Evans, Sterling, VA (US); Azzedine Benameur, Fairfaix Station, VA (US)

(73) Assignee: Symantec Corporation, Mountain View, CA (US)

( * ) Notice: Subject to any disclaimer, the term of this patent is extended or adjusted under 35 U.S.C. 154(b) by 515 days.

(21) Appl. No.: 14/645,452

(22) Filed: Mar. 12, 2015

(51) Int. Cl.
  *H04L 29/06* (2006.01)
  *H04L 29/08* (2006.01)
(52) U.S. Cl.
  CPC .......... *H04L 63/1433* (2013.01); *H04L 67/10* (2013.01)
(58) Field of Classification Search
  CPC .................... H04L 63/1433; H04L 67/10
  See application file for complete search history.

(56) References Cited

U.S. PATENT DOCUMENTS

| 6,968,539 | B1 | 11/2005 | Huang et al. | |
|---|---|---|---|---|
| 2004/0015958 | A1 | 1/2004 | Veil et al. | |
| 2005/0039171 | A1 | 2/2005 | Avakian et al. | |
| 2005/0138384 | A1 | 6/2005 | Brickell et al. | |
| 2006/0005009 | A1 | 1/2006 | Ball et al. | |
| 2007/0136811 | A1* | 6/2007 | Gruzman | G06F 21/562 726/24 |
| 2010/0064299 | A1* | 3/2010 | Kacin | G06F 9/45537 719/317 |
| 2010/0199325 | A1 | 8/2010 | Raleigh | |
| 2011/0314270 | A1* | 12/2011 | Lifliand | H04L 63/0428 713/151 |
| 2013/0125217 | A1 | 5/2013 | Edwards et al. | |
| 2013/0347064 | A1 | 12/2013 | Aissi | |

(Continued)

OTHER PUBLICATIONS

Anubhav Savant, et al; Systems and Methods for Modifying Applications Without User Input; U.S. Appl. No. 14/445,704, filed Jul. 29, 2014.

(Continued)

*Primary Examiner* — Farid Homayounmehr
*Assistant Examiner* — Suman Debnath
(74) *Attorney, Agent, or Firm* — FisherBroyles, LLP

(57) ABSTRACT

The disclosed computer-implemented method for performing application container introspection may include (1) identifying a request issued by an application launched from an application container, (2) determining that the request calls a function that facilitates transferring data between the application container and at least one external data source, and then in response to determining that the request calls the function, (3) directing the request to a function library that includes a custom version of the function that facilitates both (A) transferring, between the application container and the external data source, an encrypted version of the data that is unintelligible to an external application running outside the application container and (B) providing an unencrypted version of the data to the external application to enable the external application to inspect the data. Various other methods, systems, and computer-readable media are also disclosed.

20 Claims, 7 Drawing Sheets

(56) References Cited

U.S. PATENT DOCUMENTS

| | | | |
|---|---|---|---|
| 2014/0007117 A1* | 1/2014 | Sima | G06F 9/448 |
| | | | 718/102 |
| 2014/0181896 A1* | 6/2014 | Yablokov | H04L 63/10 |
| | | | 726/1 |
| 2014/0181974 A1* | 6/2014 | Yablokov | G06F 21/566 |
| | | | 726/23 |
| 2014/0229607 A1 | 8/2014 | Jung et al. | |
| 2014/0250433 A1 | 9/2014 | Stekkelpak et al. | |
| 2014/0331279 A1 | 11/2014 | Aissi et al. | |
| 2015/0281186 A1 | 10/2015 | Smith et al. | |
| 2016/0142212 A1 | 5/2016 | Sarangdhar et al. | |

OTHER PUBLICATIONS

Sanjay Sawhney, et al; Systems and Methods for Deploying Applications Included in Application Containers; U.S. Appl. No. 14/549,218, filed Nov. 20, 2014.

"Build, Ship and Run Any App, Anywhere", https://www.docker.com/, as accessed on Sep. 30, 2014, Docker, Inc., (Dec. 21, 1996).

Vaughan-Nichols, Steven J., "What is Docker and why is it so darn popular?", http://www.zdnet.com/what-is-docker-and-why-is-it-so-darn-popular-7000032269/, as accessed on Sep. 30, 2014, ZDNet, CBS Interactive, (Aug. 4, 2014).

Bottomley, James D., "What is All the Container Hype?", Parallels, (Apr. 2014).

Kumar, Arun, "HTTPS Security and Spoofing—Who is that Man in the Middle?", http://www.thewindowsclub.com/https-security-spoofing-man-in-the-middle, as accessed Jan. 20, 2015, (Aug. 27, 2014).

"Proposal: container introspection #8427", https://github.com/docker/docker/issues/8427, as accessed Jan. 20, 2015, GitHub, Inc., (Oct. 6, 2014).

Nakhimovsky, Greg "Building Library Interposers for Fun and Profit", http://www.drdobbs.com/building-library-interposers-for-fun-and/184404926, as accessed Jan. 20, 2015, (Nov. 1, 2001).

Brian Witten, et al; Systems and Methods for Preventing Code from Executing on Untrustworthy Platforms; U.S. Appl. No. 14/736,323, filed Jun. 11, 2015.

"Docker", https://www.docker.com/whatisdocker, as accessed on Feb. 27, 2015, (Jun. 11, 2014).

"Trusted Platform Module (TPM) Summary", http://www.trustedcomputinggroup.org/resources/trusted_platform_module_tpm_summary, as accessed Feb. 27, 2015, (Sep. 27, 2012).

"Trusted execution environment", https://en.wikipedia.org/wiki/Trusted_execution_environment, as accessed Feb. 27, 2015, Wikipedia, (On or before Feb. 27, 2015).

"Trusted Computing Group (TCG)", https://www.trustedcomputinggroup.org/, as accessed Feb. 27, 2015, (Apr. 10, 2003).

"Unified Extensible Firmware Interface Forum (UEFI)", http://www.uefi.org/, as accessed Feb. 27, 2015, (May 24, 2005).

"Code signing", https://en.wikipedia.org/wiki/Code_signing, as accessed Feb. 27, 2015, Wikipedia, (Sep. 13, 2006).

"Samsung KNOX™—White Paper : An Overview of Samsung KNOX™", http://www.samsung.com/my/business-images/resource/white-paper/2013/11/Samsung_KNOX_whitepaper_An_Overview_of_Samsung_KNOX-0.pdf, as accessed Feb. 27, 2015, Enterprise Mobility Solutions, Samsung Electronics Co. Ltd.,(Apr. 2013).

Hoekstra, Matthew, "Intel® SGX for Dummies (Intel® SGX Design Objectives)", https://software.intel.com/en-us/blogs/2013/09/26/protecting-application-secrets-with-intel-sgx, as accessed Feb. 27, 2015, Intel, (Sep. 26, 2013).

"Trustonic", https://www.trustonic.com/, as accessed Feb. 27, 2015, (Dec. 31, 2012).

"Trusted Network Connect", https://en.wikipedia.org/wiki/Trusted_Network_Connect, as accessed Feb. 27, 2015, Wikipedia, (Sep. 13, 2006).

* cited by examiner

SYSTEMS AND METHODS FOR PERFORMING APPLICATION CONTAINER INTROSPECTION

BACKGROUND

As cloud-based computing services gain increased popularity, service providers may seek increasingly lightweight methods to serve the needs of their clients. One method of providing cloud-based computing services involves the use of application containers that provide isolated environments for clients to run certain software. For example, a computing device may include an application container that executes an application isolated from the computing device's operating system and other software running outside of the application container. In this example, the application running within the application container may exchange encrypted communications with a remote device via a network.

Unfortunately, because these communications are encrypted and/or decrypted by the application executed within the application container, the computing device's operating system and other software running outside of the application container may be unable to inspect the encrypted communications. As a result, the computing device's operating system and other software may be unable to perform certain security analyses (such as data-loss-prevention analyses and/or intrusion detection and prevention analyses). Accordingly, the instant disclosure identifies and addresses a need for additional and improved systems and methods for performing application container introspection.

SUMMARY

As will be described in greater detail below, the instant disclosure describes various systems and methods for performing application container introspection by interposing custom functions to enable an external application to examine data being transferred to or from an application container. In one example, a computer-implemented method for performing application container introspection may include (1) identifying a request issued by an application launched from an application container, (2) determining that the request calls a function that facilitates transferring data between the application container and an external data source that is external to the application container, and then in response to determining that the request calls the function, (3) directing the request to a function library that includes a custom version of the function that facilitates both (A) transferring, between the application container and the external data source, an encrypted version of the data that is unintelligible to an external application running outside the application container and (B) providing an unencrypted version of the data to the external application to enable the external application to inspect the data.

In some embodiments, the external application may include and/or represent a host operating system that executes the application container, a data-loss-prevention application, and/or a computer security system. In one example, the method may also include creating the custom version of the function.

In some examples, providing the unencrypted version of the data to the external application may include enabling the external application to inspect the data before the custom version of the function facilitates transferring the encrypted version of the data between the application container and the external data source. In other examples, the computer-implemented method may include receiving, from the external application, a notification indicating that the data to be transferred potentially violates at least one security policy (such as an antimalware and/or antivirus policy) and then refraining from transferring the encrypted version of the data.

In one embodiment, the function library may reside within the application container. In such an embodiment, directing the request to the function library may include directing the request to the custom version of the function included in the function library residing within the application container.

In another embodiment, the function library may reside outside the application container and within a host operating system that hosts the application container. In this embodiment, directing the request to the function library may include identifying a link that points to the function library within the application container and then directing the request to the function library by way of the link.

In some examples, providing the unencrypted version of the data to the external application may include providing the data to the external application by way of a virtual network interface. In other examples, providing the unencrypted version of the data to the external application may include providing the data to the external application by way of shared memory.

In one embodiment, the custom version of the function may facilitate transferring the encrypted version of the data between the application container and the external data source in a manner identical to an original version of the function.

In some examples, providing the unencrypted version of the data to the external application may include delivering the unencrypted version of the data to the external application to ensure that the data does not violate a data-loss-prevention policy before the data is encrypted. In these examples, transferring the encrypted version of the data between the application container and the external data source may include, upon ensuring that the data does not violate the data-loss-prevention policy, encrypting the data for secure transmission from the application container to the external data source and then transmitting the encrypted data from the application container to the external data source in accordance with the data-loss-prevention policy.

In other examples, transferring the encrypted version of the data between the application container and the external data source may include receiving the encrypted version of the data at the application container from the external data source. In such examples, providing the unencrypted version of the data to the external application may include generating the unencrypted version of the data by decrypting the encrypted version of the data and then delivering the unencrypted version of the data to the external application to ensure that the data does not violate a security policy (such as an antimalware and/or antivirus policy) before the application running inside the application container handles a potentially malicious payload (e.g., a malware binary or shell code) included within the data.

In one embodiment, a system for implementing the above-described method may include (1) an identification module, stored in memory, that identifies a request issued by an application launched from an application container, (2) a determination module, stored in memory, that determines that the request calls a function that facilitates transferring data between the application container and an external data source that is external to the application container, (3) a directing module, stored in memory, that directs the request to a function library that may include a custom version of the function that facilitates both facilitate both (A) transferring an encrypted version of the data that is unintelligible to an external application running outside the application container between the application container and the external data source and (B) providing an unencrypted version of the data to the external application to enable the external application to inspect the data, and (4) at least one physical processor configured to execute the identification module, the determination module, and the directing module. In one example, the system may also include a creating module, stored in memory, that creates the custom version of the function.

In some examples, the above-described method may be encoded as computer-readable instructions on a non-transitory computer-readable medium. For example, a computer-readable medium may include one or more computer-executable instructions that, when executed by at least one processor of a computing device, causes the computing device to (1) identify a request issued by an application launched from an application container, (2) determine that the request calls a function that facilitates transferring data between the application container and an external data source that is external to the application container, and then (3) directs the request to a function library that includes a custom version of the function that facilitates both (A) transferring, between the application container and the external data source, an encrypted version of the data that is unintelligible to an external application running outside the application container and (B) providing an unencrypted version of the data to the external application to enable the external application to inspect the data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
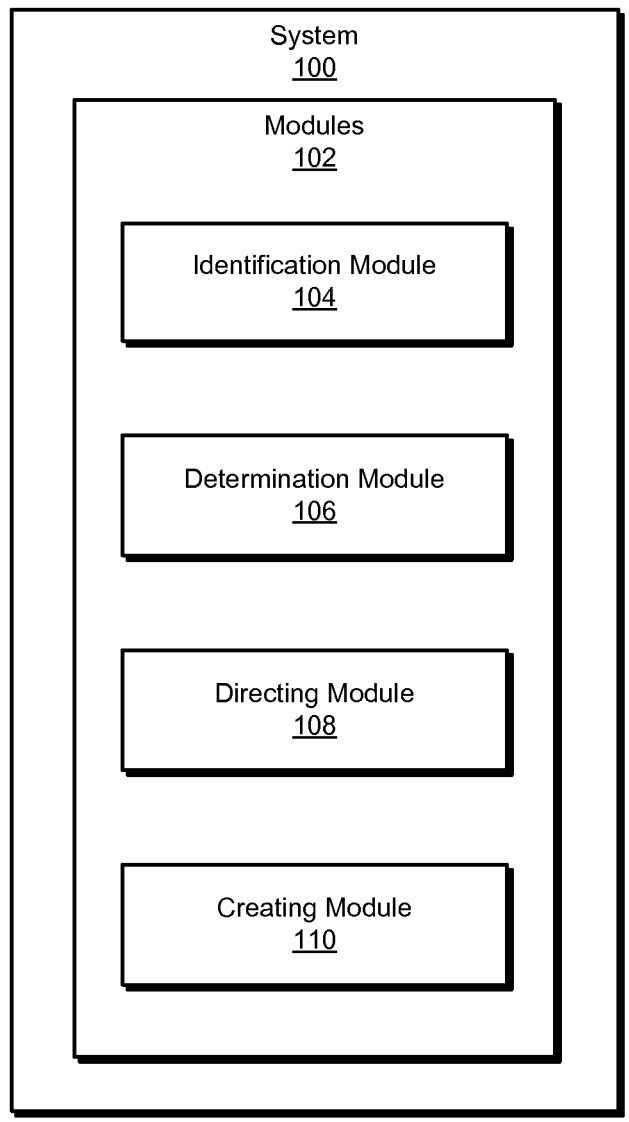
FIG. 1 is a block diagram of an exemplary system for performing application container introspection.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for performing application container introspection. As will be explained in greater detail below, systems and methods described herein may enable a host operating system and/or other software running outside of an application container to efficiently monitor and/or inspect data transferred between the application container and an external data source that is external to the application container (e.g., a remote computing device and/or a hard drive disk attached to a computing device). In doing so, the systems and methods described herein may be able to facilitate performing certain security analyses (such as data-loss-prevention analyses and/or intrusion detection and prevention analyses) on such data. As a result, the systems and methods described herein may strengthen the security of the computing device that includes the application container.

The following will provide, with reference to FIGS. 1, 2, 4, and 5, detailed descriptions of exemplary systems for performing application container introspection. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for performing application container introspection. As illustrated in this figure, exemplary system 100 may include one or more modules 102 for performing one or more tasks. For example, and as will be explained in greater detail below, exemplary system 100 may include an identification module 104 that identifies a request issued by an application launched from an application container. Exemplary system 100 may additionally include a determination module 106 that determines that the request calls a function that facilitates transferring data between the application container and at least one external data source. Further, exemplary system 100 may include a directing module 108 that directs the request to a function library that includes a custom version of the function. Exemplary system 100 may additionally include a creating module 110 that creates the custom version of the function. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
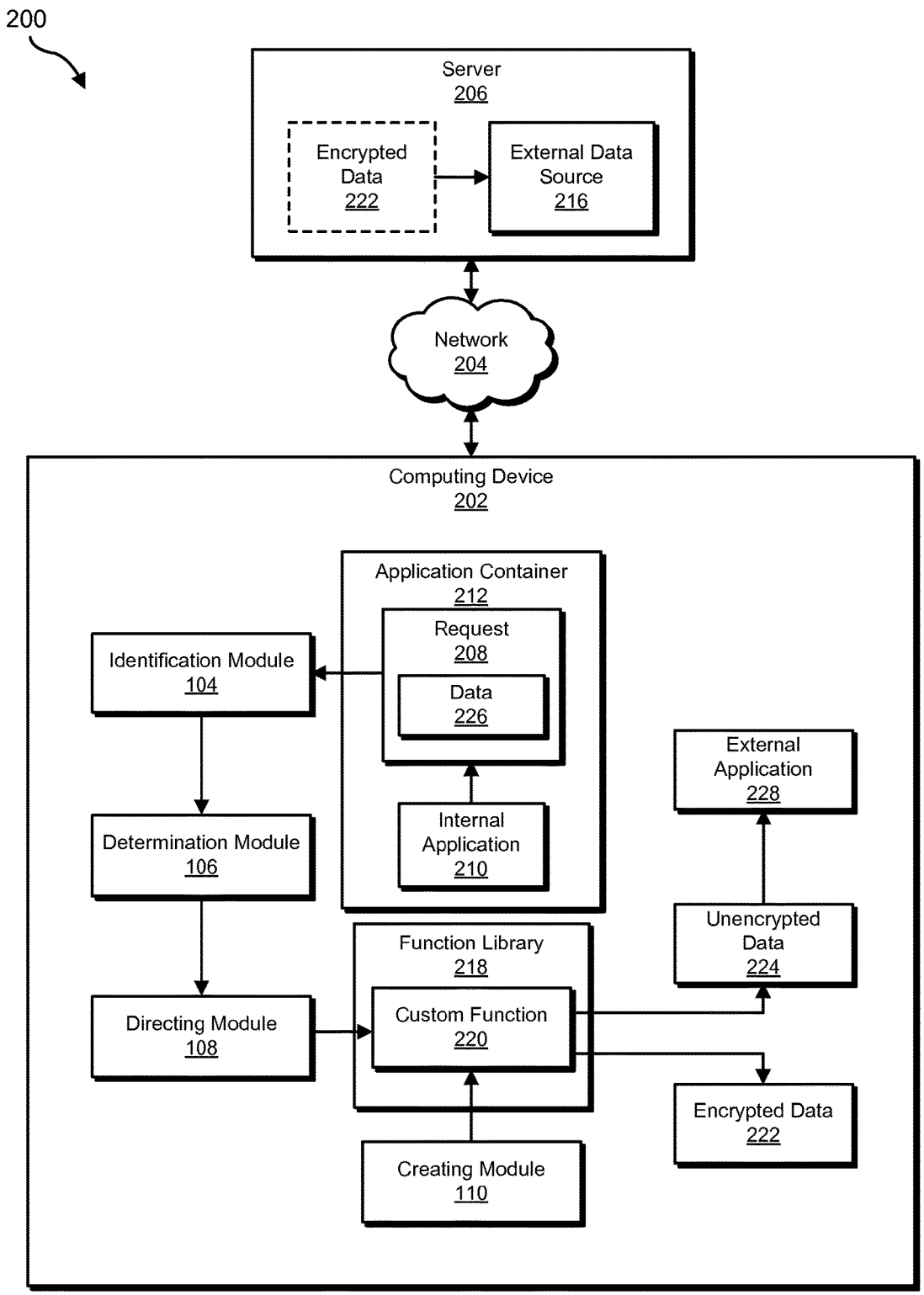
FIG. 2 is a block diagram of an additional exemplary system for performing application container introspection.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, enable computing device 202 and/or server 206 to monitor and/or inspect data being transferred to or from an application container. For example, and as will be described in greater detail below, one or more of modules 102 may cause computing device 202 and/or server 206 to perform application container introspection. For example, and as will be described in greater detail below, identification module 104 may identify a request 208 issued by an application launched from an application container 212. Determination module 106 may determine that request 208 calls a function that facilitates transferring data 226 between application container 212 and an external data source 216. Directing module 108 may direct request 208 to a custom function 220 within a function library 218. Custom function 220 may facilitate both (A) transferring encrypted data 222 between application container 212 and external data source 216 and (B) providing unencrypted data 224 to an external application 228. Moreover, in some embodiments, creating module 110 may create a custom function 220.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device capable of communicating with computing devices and/or application containers via a network. Examples of server 206 include, without limitation, application servers, web servers, security servers, storage servers, and/or database servers configured to run certain software applications and/or provide various web, security, storage, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Application container 212 generally represents an instance of operating-system-level virtualization that utilizes the operating system kernel of a host operating system. Such utilization of the host operating system kernel may enable application containers to function without necessitating the full hardware virtualization of virtual machines while still providing an isolated environment within which to execute applications. Such isolation may prevent applications inside the application container from interacting with applications outside the application container (and/or vice versa) in one way or another. Additionally or alternatively, such isolation may prevent applications inside the application container from interacting with the host operating system (and/or vice versa) in one way or another. In one example, a host operating system may host multiple application containers, and the host operating system may designate individual file systems, storage space, processor access, memory blocks, etc., for each application container. Examples of application container 212 include, without limitation, DOCKER application containers, ROCKET application containers, LINUX CONTAINER (LXC) application containers, variations of one or more of the same, combinations of one or more of the same, or any other suitable application containers.

External data source 216 generally represents any type or form of computing device, storage device, software, and/or virtual environment capable of sending, receiving, storing, and/or facilitating access to data. In some examples, external data source 216 may include and/or represent a remote computing device and/or virtual machine that communicates with applications launched from application container 212. In other examples, external data source 216 may include and/or represent a hardware-based storage device that communicates with and/or is access by applications launched from application container 212. Although illustrated as part of server 206 in FIG. 2, external data source 216 may alternatively represent part of computing device 202 (e.g., a local hard disk drive of computing device 202). Examples of external data source 216 include, without limitation, laptops, tablets, desktops, servers, removable media storage devices (such as Universal Serial Bus (USB) drives), hard disk drives, volatile memory devices, solid state drives, cellular phones, PDAs, multimedia players, embedded systems, wearable devices, gaming consoles, other application containers, software installed on one or more of the same, virtual machines launched on one or more of the same, combinations of one or more of the same, or any other suitable external data source.

Function library 218 generally represents any file or collection of files that includes functions designed for use by executable files, code, and/or other shared objects. In some examples, function library 218 may include resources such as configuration data, message templates, pre-written programming code, or any other information for use by other files and/or code. Files may access function library 218 in a variety of ways. For example, an executable file may contain a static link to function library 218 or a specific function included in function library 218. In this example, the static link to function library 218 or the specific function included in function library 218 may resolve when the executable file is created. Additionally or alternatively, an executable file may contain a dynamic link to function library 218 or a specific function included in function library 218. In these examples, the dynamic link to function library 218 or the specific function included in function library 218 may resolve while the executable file is being loaded or executed (rather than when the executable file is created).

Custom function 220 generally represents any type or form of code or collection of code that augments and/or replaces an existing function that facilitates transferring data. Custom function 220 may be stored as part of a function library, such as function library 218. In some examples, custom function 220 may contain a reference or link to the original function to perform the original function as well as additional code that augments the original function. In other examples, custom function 220 may contain its own code that mimics the original function as well as additional code that augments the original function. Examples of custom function 220 include, without limitation, custom read functions, custom write functions, custom send functions, custom receive functions, variations of one or more of the same, combinations of one or more of the same, or any other suitable custom function that facilitates transferring data.

External application 228 generally represents any type or form of software application or system that inspects data being transferred to or from a computing device. External application 228 may be responsible for a variety of tasks, including but not limited to, performing security inspections on data transferred to and/or from computing device 202. Examples of external application 228 include, without limitation, operating systems (e.g., MICROSOFT WINDOWS), data-loss-prevention applications, intrusion detection systems, intrusion prevention systems, firewall systems, antivirus applications (e.g., NORTON ANTIVIRUS), software security systems (e.g., NORTON INTERNET SECURITY), portions of one or more of the same, variations of one or more of the same, combinations of one or more of the same, or any other suitable application that inspects data being transferred to or from a computing device. Although illustrated as part of computing device 202 in FIG. 2, external application 228 may alternatively include and/or represent an application running on a remote computing device (not illustrated in FIG. 2).

Figure 3:
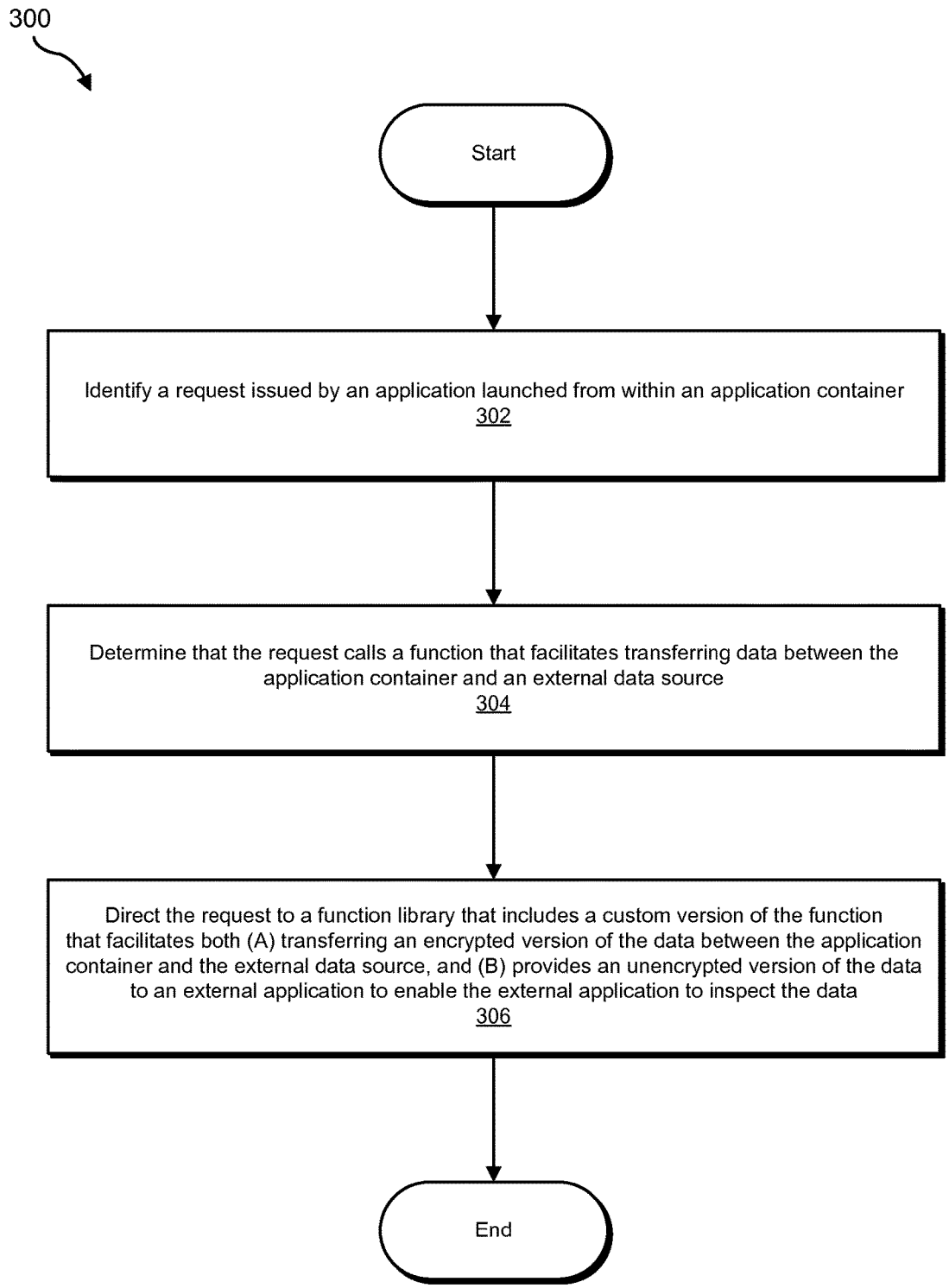
FIG. 3 is a flow diagram of an exemplary method for performing application container introspection.

FIG. 3 is a flow diagram of an exemplary computer-implemented method 300 for performing application container introspection. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify a request issued by an application launched from an application container. For example, identification module 104 may, as part of computing device 202 in FIG. 2, identify request 208 issued by internal application 210 launched from application container 212. In this example, request 208 may include data 226 that either has been transferred from external data source 216 or is intended for transfer to external data source 216 via network 204.

Identification module 104 may identify request 208 in a variety of ways. In one example, identification module 104 may monitor application container 212 for any requests issued by applications launched from application container 212. In this example, while monitoring application container 212 in this way, identification module 104 may identify request 208 issued by internal application 210.

In some examples, identification module 104 may represent a portion of application container 212 that parses request 208 to locate any shared libraries that include functions called by request 208. Upon parsing request 208 in this way, identification module 104 may identify request 208 as originating from an application launched from application container 212.

In other examples, identification module 104 may represent a dynamic linking component of an operating system running on computing device 202. In these examples, identification module 104 may load shared libraries called by an executable file while the executable file is running and/or as the executable file is prepared for execution. Upon loading the shared libraries in this way, identification module 104 may identify request 208 as originating from an application launched from application container 212.

At step 304 in FIG. 3, one or more of the systems described herein may determine that the request calls a function that facilitates transferring data between the application container and at least one external data source. For example, determination module 106 may, as part of computing device 202 in FIG. 2, determine that request 208 calls a function that facilitates transferring data 226 between application container 212 and at least one external data source 216. Examples of such a function include, without limitation, read functions, write functions, send functions, receive functions, variations of one or more of the same, combinations of one or more of the same, or any other suitable function that facilitates transferring data.

Determination module 106 may determine that request 208 calls the function in a variety of ways. In some examples, determination module 106 may determine that request 208 calls the function by examining the name of the called function. For example, determination module 106 may match the name of the called function to a regular expression. Additionally or alternatively, determination module 106 may compare the name of the called function to a list of function names stored in a database that shows relationships between functions and tasks (such as transferring data) fulfilled by executing the functions.

In other examples, determination module 106 may identify the library that contains the called function. Determination module 106 may then determine that the library called by request 208 generally contains functions that facilitate data transfer between the application container and outside computing environments. For example, determination module 106 may identify a list of function libraries that include metadata describing the tasks performed by the functions contained in the function libraries.

At step 306, one or more of the systems described herein may direct the request to a function library that includes a custom version of the function that facilitates both (A) transferring, between the application container and the external data source, an encrypted version of the data that is unintelligible to an external application running outside the application container and (B) providing an unencrypted version of the data to the external application to enable the external application to inspect the data. For example, directing module 108 may, as part of computing device 202 in FIG. 2, direct request 208 to function library 218 that includes custom function 220 in response to the determination that request 208 calls the original function. Custom function 220 may facilitate (A) transferring, between application container 212 and external data source 216, an encrypted version of data 226 that is unintelligible to external application 228 running outside application container 212 and (B) providing an unencrypted version of data 226 to external application 228 to enable external application 228 to inspect data 226. In this example, external application 228 may be responsible for performing one or more security inspections on data transferred to and/or from application container 212.

Directing module 108 may direct request 208 to function library 218 in a variety of ways. In one example, directing module 108 may direct request 208 to function library 218 and/or custom function 220 by redirecting and/or rerouting request 208 in response to the determination that request 208 calls the original function. For example, directing module 108 may determine that custom function 220 has superseded, replaced, and/or supplanted the original function. In response to this determination, directing module 108 may redirect and/or reroute request 208 to function library 218 and/or straight to custom function 220. By redirecting and/or rerouting request 208 in this way, directing module 108 may ensure that request 208 arrives at and/or calls custom function 220 instead of the original function.

In another example, directing module 108 may direct request 208 to function library 218 and/or custom function 220 by reconfiguring function library 218 and/or replacing the original function with custom function 220 prior to the launch of internal application 210. For example, prior to the launch of internal application 210, directing module 108 may reconfigure function library 218 such that custom function 220 is located in the same location previously occupied by the original function. Additionally or alternatively, directing module 108 may replace the original function with custom function 220 such that all calls to the original function ultimately arrive at and/or call custom function 220. By reconfiguring function library 218 and/or replacing the original function in this way, directing module 108 may ensure that request 208 arrives at and/or calls custom function 220 instead of the original function.

In some examples, function library 218 may reside within application container 212. In these examples, directing request 208 to function library 218 may include directing request 208 to custom function 220 included in function library 218 residing within application container 212 (similar to the systems illustrated in FIGS. 4 and 5).

In other examples, function library 218 may reside outside application container 212 but within the host operating system (similar to the system illustrated in FIG. 2). In these examples, directing request 208 to function library 218 may include identifying a link within application container 212 that points to function library 218 and forwarding request 208 to function library 218 by way of the link identified within application container 212.

Directing module 108 may identify the link to function library 218 in a variety of ways. In some examples, directing module 108 may identify a static link to function library 218 inserted when application container 212 was compiled. In other examples, directing module 108 may identify a dynamic link to function library 218. In these examples, a dynamic linker (which may be a standalone script and/or a component of an operating system) may load and/or link the libraries referenced by internal application 210 when application 210 is executed and/or launched.

In some examples, custom function 220 may facilitate transferring an encrypted version of the data between the application container and the external data source. For example, custom function 220 may cause an encrypted version of data 226 (e.g., encrypted data 222 in FIG. 2) that is unintelligible to external application 228 to be transferred between application container 212 and external data source 216. Accordingly, unencrypted data 224 may include and/or represent an unencrypted version of encrypted data 222. Likewise, encrypted data 222 may include and/or represent an encrypted version of unencrypted data 224.

Custom function 220 may facilitate transferring encrypted data 222 from application container 212 to external data source 216 in a variety of ways. In one embodiment, custom function 220 may facilitate transferring encrypted data 222 between application container 212 and external data source 216 in a manner identical to an original version of the function. For example, custom function 220 may include a reference or link to the original requested function. As a specific example, request 208 may include a request to encrypt data 226 using the OPENSSL encryption scheme. In this example, custom function 220 may call functions from a shared OPENSSL library that is stored or referenced elsewhere in application container 212.

Figure 4:
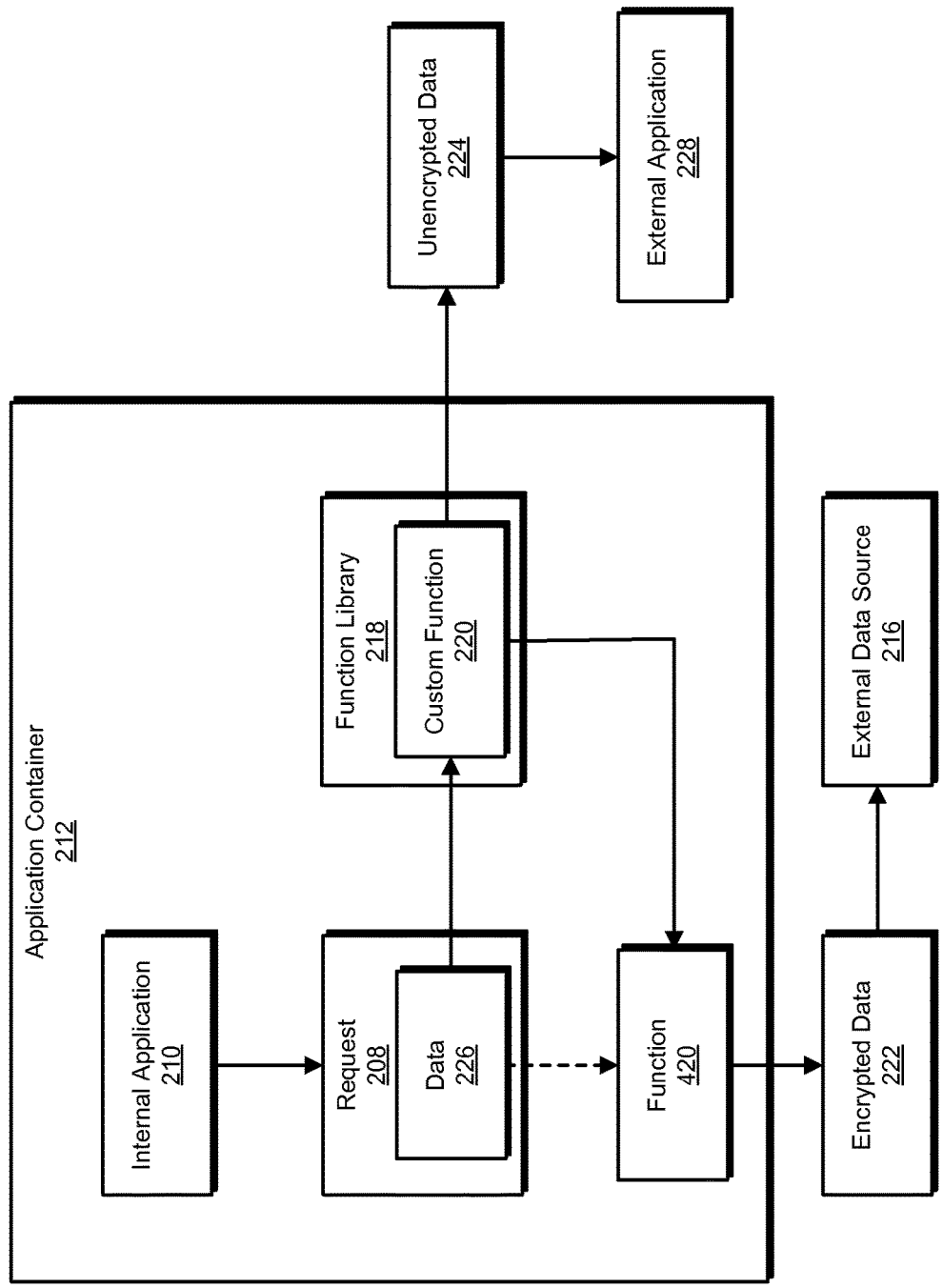
FIG. 4 is a block diagram of an additional exemplary computing system for inspecting data transferred from an application container.

As illustrated in FIG. 4, application container 212 may host internal application 210. Once launched, internal application 210 may issue request 208 to transmit data 226 to external data source 216. Directing module 108 may direct request 208 to custom function 220 stored in function library 218. In this example, custom function 220 may provide unencrypted data 224 to external application 228 and then call an original function 420 that provides encrypted data 222 to external data source 216. Although contrary to the example illustrated in FIG. 4, custom function 220 may alternatively contain its own functionality that provides encrypted data 222 to external data source 216 without invoking original function 420.

Figure 5:
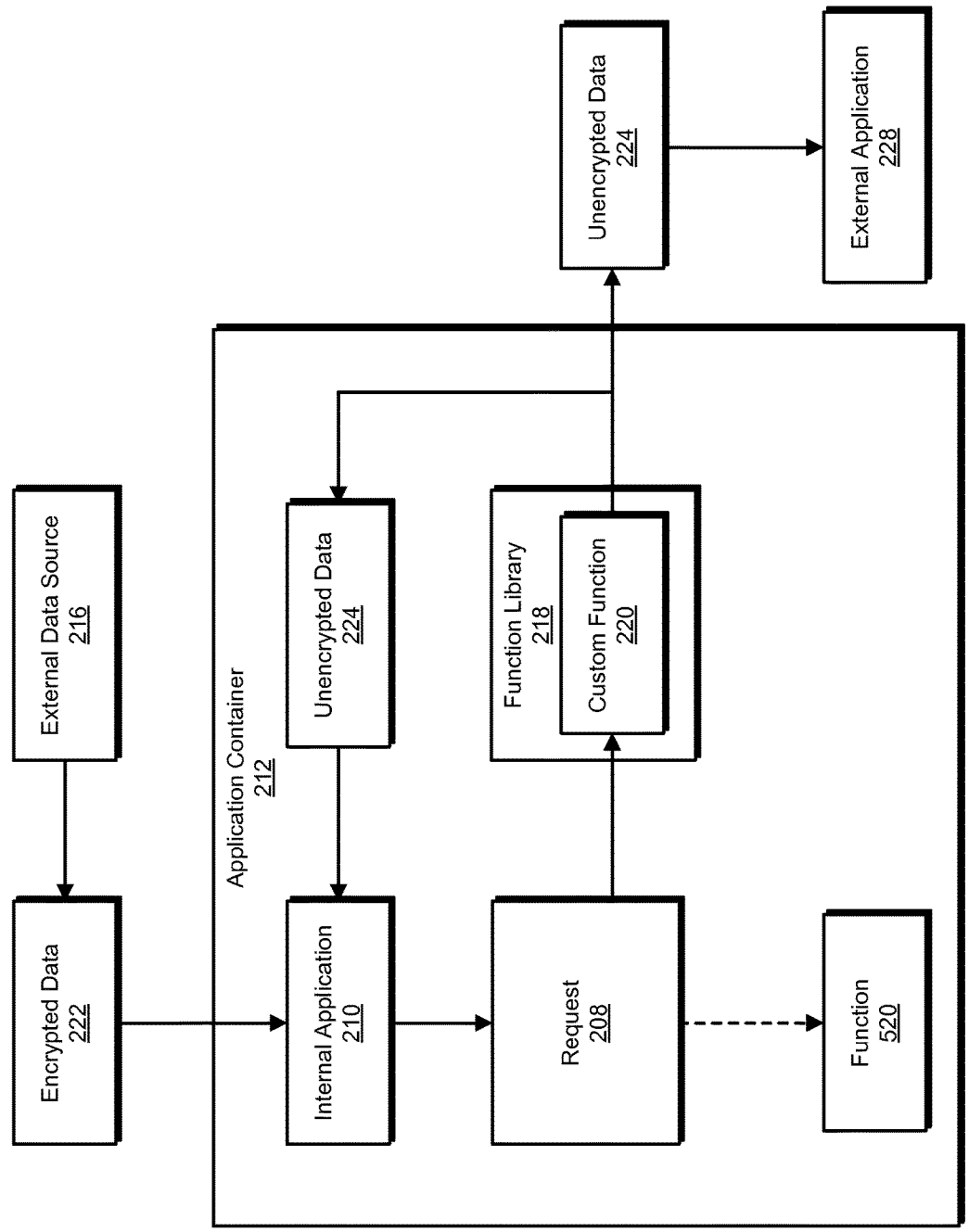
FIG. 5 is a block diagram of an additional exemplary computing system for inspecting data transferred to an application container.

As an example, custom function 220 may include its own code or subroutines that mirror the functionality of the original requested function. As illustrated in FIG. 5, internal application 210 may receive encrypted data 222 from external data source 216. Internal application 210 may issue request 208 for a function 520 to read and/or decrypt encrypted data 222. Determination module 106 may determine that function 520 facilitates reading and/or decrypting data transferred of data from external sources (such as external data source 216). Directing module 108 may direct request 208 to function library 218 that includes custom function 220. In this example, custom function 220 may include certain code that facilitates reading and/or decrypting encrypted data 222 without calling function 520. Although contrary to the example illustrated in FIG. 5, custom function 220 may alternatively call function 520 as part of reading and/or decrypting encrypted data 222.

Custom function 220 may provide unencrypted data 224 to external application 228 in a variety of ways. In some examples, custom function 220 may provide unencrypted data 224 to external application 228 by way of a virtual network interface. In other examples, custom function 220 may provide unencrypted data 224 to external application 228 by way of shared memory.

In some embodiments, custom function 220 may provide unencrypted data 224 to external application 228 before facilitating transmission of encrypted data 222. For example, custom function 220 may first wait for a response from external application 228 before fulfilling request 208.

As a specific example, internal application 210 may issue request 208 to transmit data 226 from application container 212 to external data source 216. In this example, external application 228 may include and/or represent an application that inspects data to ensure that transferring the data complies with a data-loss-prevention policy. Directing module 108 may direct request 208 to custom function 220, and custom function 220 may deliver unencrypted data 224 to external application 228 before data 226 is encrypted to ensure that transferring data 226 to external data source 216 does not violate the data-loss-prevention policy. Upon ensuring that transferring data 226 does not violate the data-loss-prevention policy, custom function 220 may facilitate encrypting data 226 for secure transmission to external data source 216. In some cases, external application 228 may determine that transferring data 226 does violate a data-lossprevention policy. In these cases, external application 228 may prevent custom function 220 from facilitating the transmission of data 226 and/or computing device 202 from transmitting data 226.

As an additional example, internal application 210 may receive encrypted data 222 from external data source 216 and issue request 208 to decrypt encrypted data 222. Directing module 108 may direct request 208 to custom function 220 to generate unencrypted data 224 by decrypting encrypted data 222. Custom function 220 may deliver unencrypted data 224 to external application 228 before application 210 handles a potentially malicious payload (e.g., a malware binary or shell code) within unencrypted data 224. In this example, external application 228 may include and/or represent a computer security system (such as an antivirus application, an intrusion detection system, and/or an intrusion prevention system) that imposes a security policy (such as an antimalware and/or antivirus policy) on application container 212 in order to prevent users and/or applications from downloading and/or executing malicious content. In one example, external application 228 may allow custom function 220 to provide unencrypted data 224 to internal application 210 upon ensuring that unencrypted data 224 does not contain a potentially malicious payload. Additionally or alternatively, external application 228 may determine that unencrypted data 224 contains a malicious payload (e.g., a malware binary or shell code) and then prevent custom function 220 from delivering unencrypted data 224 to internal application 210 and/or allowing internal application 210 to handle (e.g., execute) unencrypted data 224.

In some examples, the systems and methods described herein may create the custom version of the function to address the inability of external application 228 to inspect encrypted data 222. For example, creating module 110 may, as part of computing device 202 in FIG. 2, create custom function 220 to address the inability of external application 228 to inspect encrypted data 222. In one example, creating module 110 may create custom function 220 and then store custom function 220 within function library 218 during compilation of application container 212. In this example, creating module 110 may "bake in" a reference to function library 218 as part of application container 212 such that certain function calls made within application container 212 (e.g., by internal application 210) are automatically directed to function library 218 and/or custom function 220.

In another example, creating module 110 may store function library 218 within the file system of application container 212 and/or as part of a common mount point for application container 212. In this example, directing module 108 may dynamically link certain function calls made by applications running inside application container 212 to custom function 220 (e.g., through an LD_PRELOAD set).

As described above, systems and methods described herein may enable a host operating system and/or another application running outside an application container to efficiently monitor data being transferred between the application container and an external data source even in the event that such data transfers utilize end-to-end encryption. In doing so, the systems and methods described herein may be able to facilitate performing certain security analyses (such as data-loss-prevention analyses and/or intrusion detection and prevention analyses) on such data. As a result, the systems and methods described herein may strengthen the security of computing devices that launch applications from such an application container.

Figure 6:
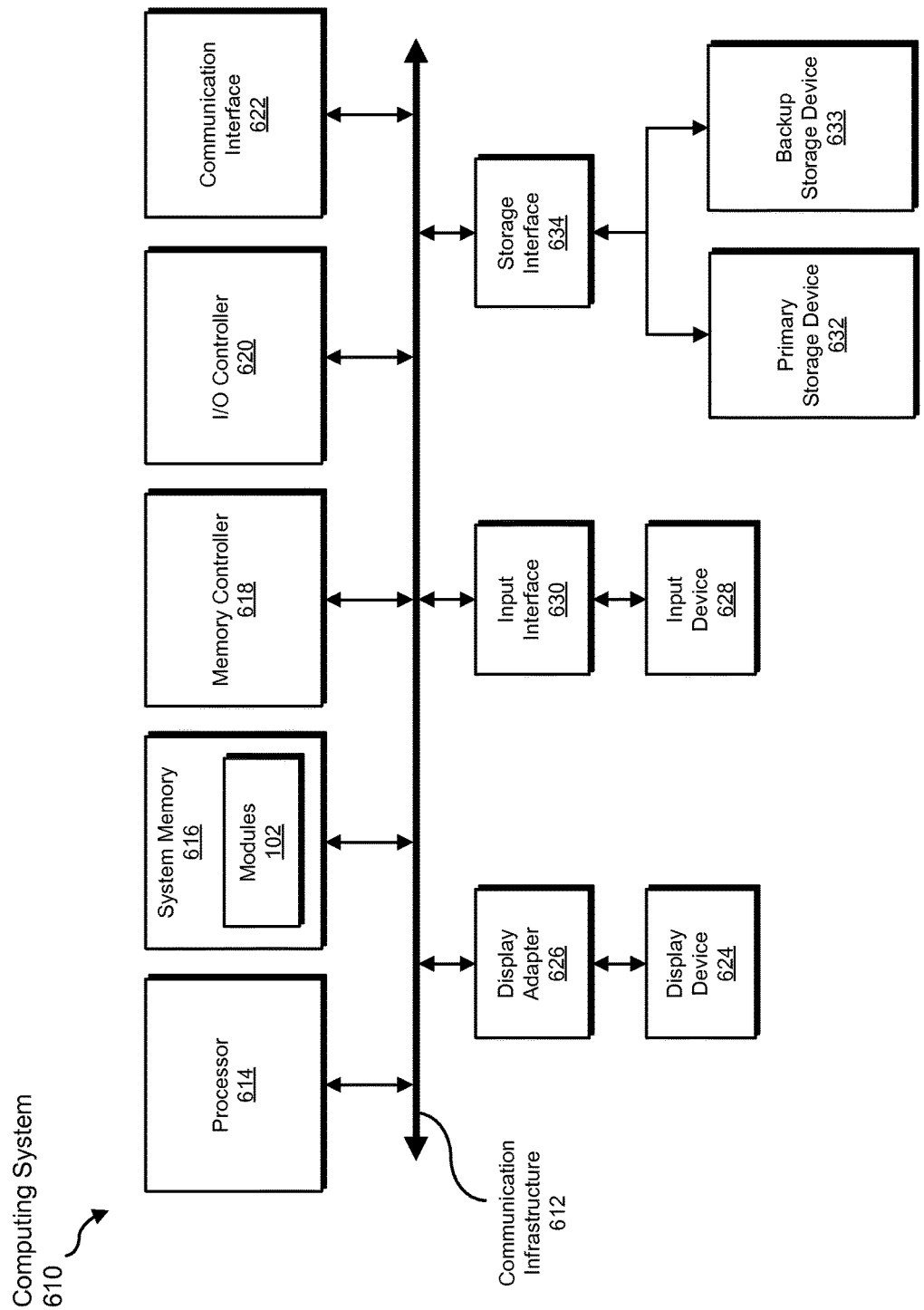
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
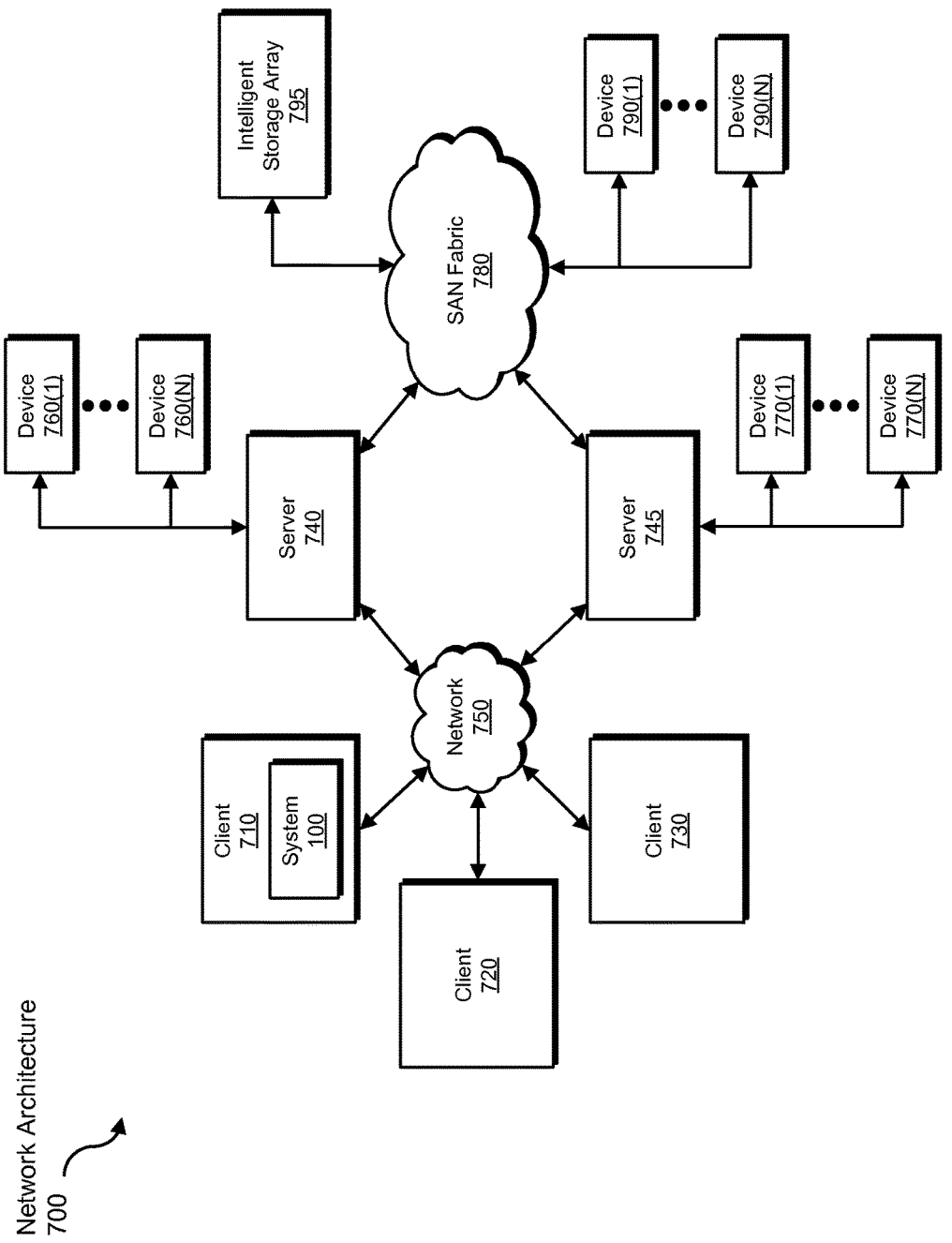
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for performing application container introspection.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data-loss-prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, antimalware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more systems described herein may identify a request to execute a function that encrypts or decrypts data, transform the request into a directive to execute a custom function, use the custom function to encrypt or decrypt the data, output a result of the custom function to the application that originally issued the request, provide a copy of the data to an external application, and/or use the copy of the data to facilitate the proper functioning of a software security system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for performing application container introspection, at least a portion of the method being performed by a computing device comprising at least one processor, the method comprising:

identifying a request issued by an application launched from within an application container that isolates the application from a host operating system while simultaneously utilizing the operating system kernel of the host operating system;

determining that the request calls an original function that processes transferring, using end-to-end encryption, data between the application container and at least one external data source that is external to the application container; and in response to determining that the request calls the original function, directing the request to a function library that includes a custom version of the original function that processes, without allowing the request to resolve to the original function, both:

using end-to-end encryption, transferring, between the application container and the external data source, an encrypted version of the data that is unintelligible to an external application running outside the application container; and providing an unencrypted version of the data to the external application to enable the external application to inspect the data.

2. The method of claim 1, wherein the external application comprises at least one of:
a host operating system that executes the application container;
a data-loss-prevention application; and
a computer security system.

3. The method of claim 1, wherein the custom version of the function processes transferring the encrypted version of the data between the application container and the external data source in a manner identical to an original version of the function.

4. The method of claim 1, wherein providing the unencrypted version of the data to the external application comprises enabling the external application to inspect the data before the custom version of the function processes transferring the encrypted version of the data between the application container and the external data source.

5. The method of claim 4, further comprising:
receiving, from the external application, a notification indicating that the data to be transferred potentially violates at least one security policy; and
refraining, in response to receiving the notification, from transferring the encrypted version of the data.

6. The method of claim 1, wherein:
the function library resides within the application container; and
directing the request to the function library comprises directing the request to the custom version of the function included in the function library residing within the application container.

7. The method of claim 1, wherein:
the function library resides outside the application container and within a host operating system that hosts the application container; and
directing the request to the function library comprises:
identifying, within the application container, a link that points to the function library; and
directing the request to the function library by way of the link identified within the application container.

8. The method of claim 1, wherein providing the unencrypted version of the data to the external application further comprises providing the data to the external application by way of a virtual network interface.

9. The method of claim 1, wherein providing the unencrypted version of the data to the external application further comprises providing the data to the external application by way of shared memory.

10. The method of claim 1, wherein:
providing the unencrypted version of the data to the external application comprises delivering, before the data is encrypted, the unencrypted version of the data to the external application to ensure that the data does not violate a data-loss-prevention policy; and transferring the encrypted version of the data between the application container and the external data source comprises, upon ensuring that the data does not violate the data-loss-prevention policy:

encrypting the data for secure transmission from the application container to the external data source; and transmitting the encrypted data from the application container to the external data source in accordance with the data-loss-prevention policy.

11. The method of claim 1, wherein:
transferring the encrypted version of the data between the application container and the external data source comprises receiving the encrypted version of the data at the application container from the external data source; and providing the unencrypted version of the data to the external application comprises:

generating the unencrypted version of the data by decrypting the encrypted version of the data; and delivering, before the application running inside the application container handles a potentially malicious payload included within the data, the unencrypted version of the data to the external application to ensure that the data does not violate a security policy.

12. The method of claim 1, wherein the external data source comprises at least one of:
a remote computing device;
a virtual machine; and
a storage device.

13. The method of claim 1, wherein the application container isolates the application from the host operating system by:
preventing the application from interacting with applications outside the application container; and
preventing applications outside the application container from interacting with the application.

14. A system for performing application container introspection, the system comprising:
at least one physical processor; and
a memory, the memory having stored thereon instructions that, when executed by the at least one physical processor, cause the system to:

identify a request issued by an application launched from within an application container that isolates the application from a host operating system while simultaneously utilizing the operating system kernel of the host operating system;

determine that the request calls an original function that processes transferring, using end-to-end encryption, data between the application container and at least one external data source that is external to the application container; and in response to determining that the request calls the original function, direct the request to a function library that includes a custom version of the original function that processes, without allowing the request to resolve to the original function, both:

using-end-to-end encryption, transferring, between the application container and the external data source, an encrypted version of the data that is unintelligible to an external application running outside the application container; and providing an unencrypted version of the data to the external application to enable the external application to inspect the data.

15. The system of claim 14, wherein the custom version of the function processes transferring the encrypted version of the data between the application container and the external data source in a manner identical to an original version of the function.

16. The system of claim 14, wherein the custom version of the function provides the unencrypted version of the data to the external application by enabling the external application to inspect the data before the custom version of the function processes transferring the encrypted version of the data between the application container and the external data source.

17. The system of claim 16, further comprising:
receiving, from the external application, a notification indicating that the data to be transferred potentially violates at least one security policy; and
refraining, in response to receiving the notification, from transferring the encrypted version of the data.

18. The system of claim 14, wherein:
the function library resides within the application container; and
directing the request to the function library comprises directing the request to the custom version of the function included in the function library residing within the application container.

19. The system of claim 14, wherein:
the function library resides outside the application container and within a host operating system that hosts the application container; and
directing the request to the function library comprises:
identifying, within the application container, a link that points to the function library; and
directing the request to the function library by way of the link identified within the application container.

20. A non-transitory computer-readable medium comprising one or more computer-readable instructions that, when executed by at least one processor of a computing device, cause the computing device to:
identify a request issued by an application launched from within an application container that isolates the application from a host operating system while simultaneously utilizing the operating system kernel of the host operating system;
determine that the request calls an original function that processes transferring, using end-to-end encryption, data between the application container and at least one external data source that is external to the application container; and
in response to determining that the request calls the original function, direct the request to a function library that includes a custom version of the function that processes, without allowing the request to resolve to the original function, both:
using end-to-end encryption, transferring, between the application container and the external data source, an encrypted version of the data that is unintelligible to an external application running outside the application container; and
providing an unencrypted version of the data to the external application to enable the external application to inspect the data.

\* \* \* \* \*

UNITED STATES PATENT AND TRADEMARK OFFICE
CERTIFICATE OF CORRECTION

| | | |
|---|---|---|
| PATENT NO. | : 10,447,720 B1 | Page 1 of 1 |
| APPLICATION NO. | : 14/645452 | |
| DATED | : October 15, 2019 | |
| INVENTOR(S) | : Nathan Evans et al. | |

It is certified that error appears in the above-identified patent and that said Letters Patent is hereby corrected as shown below:

On the Title Page

In Column 1, item (72), Inventors, Line 2, delete "Fairfaix" and insert -- Fairfax --, therefor.

Signed and Sealed this
Tenth Day of December, 2019

Andrei Iancu
*Director of the United States Patent and Trademark Office*